May 29, 1923.
1,456,953
A. VON GROELING
SEPARATION OF NATURAL GAS AND DISTILLATION GASES INTO GASOLINE AND OTHER CONSTITUENTS
Filed Sept. 28, 1918
2 Sheets-Sheet 2
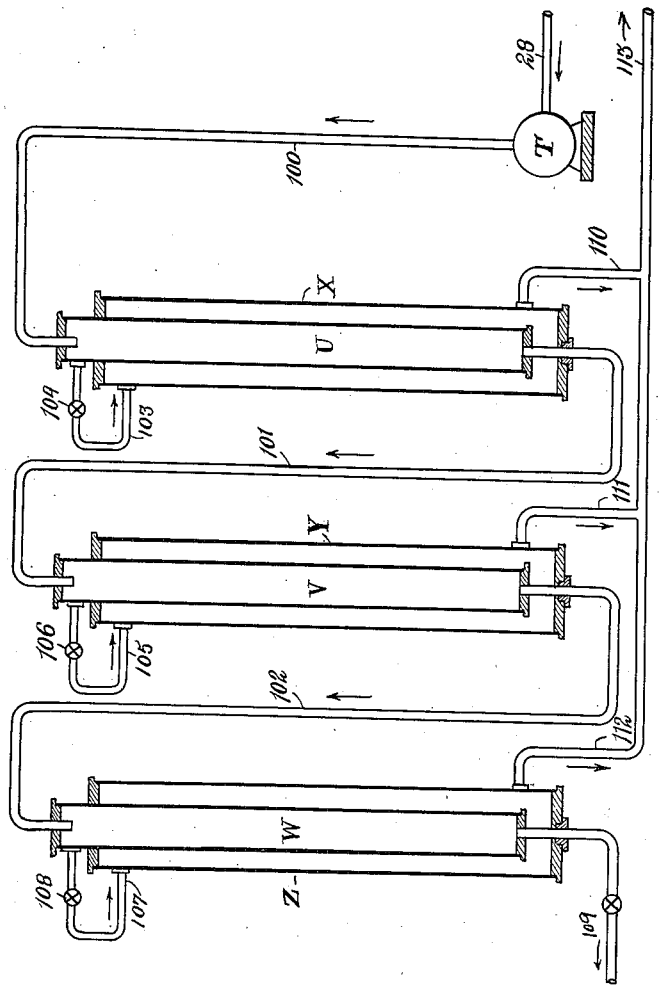

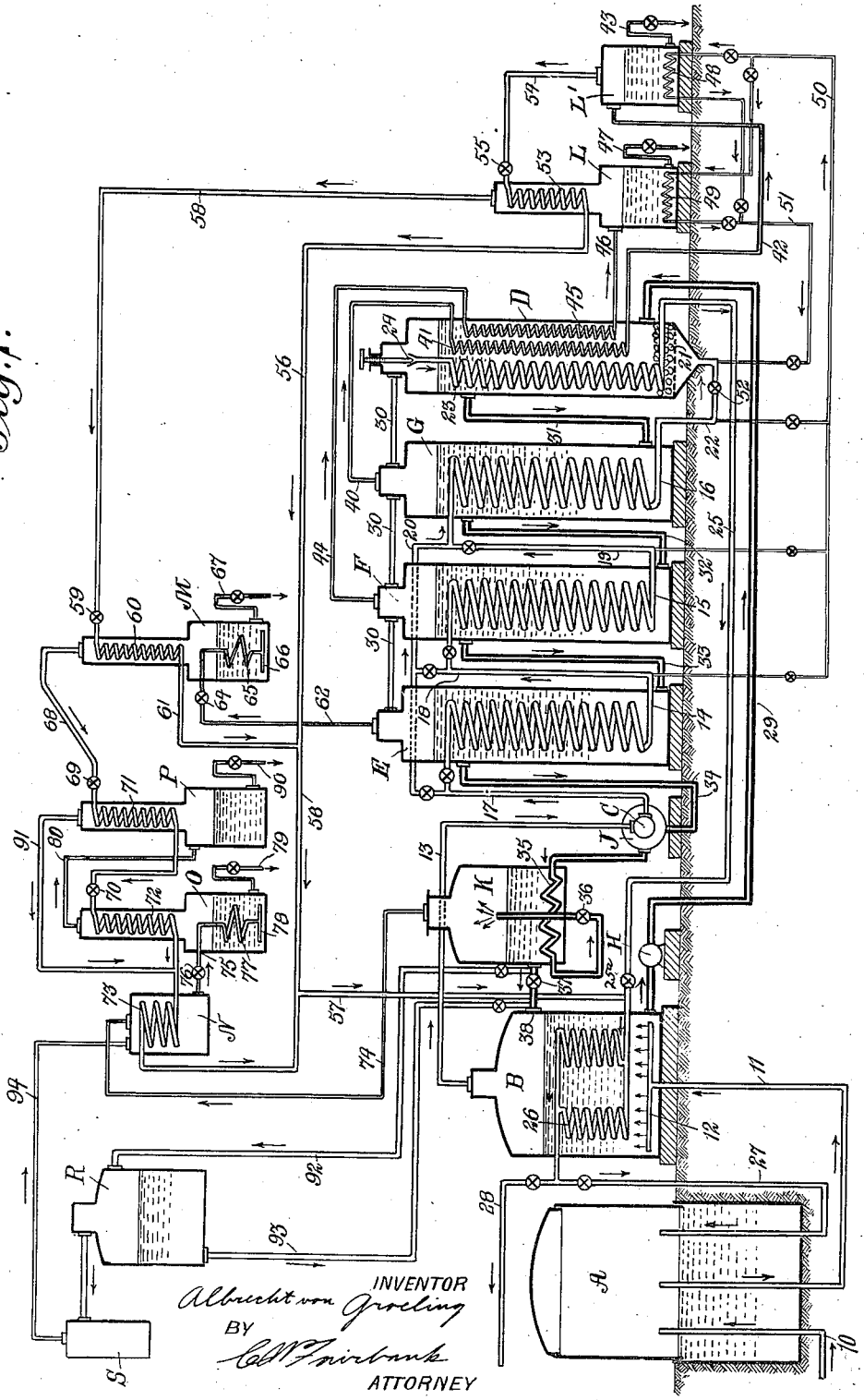

Patented May 29, 1923.

1,456,953

UNITED STATES PATENT OFFICE.

ALBRECHT VON GROELING, OF NEW YORK, N. Y., ASSIGNOR TO NATIONAL REFINING CORPORATION, INC., OF NEW YORK, N. Y., A CORPORATION OF NEW YORK.

SEPARATION OF NATURAL GAS AND DISTILLATION GASES INTO GASOLINE AND OTHER CONSTITUENTS.

Application filed September 28, 1918. Serial No. 256,030.

*To all whom it may concern:*

Be it known that I, ALBRECHT VON GROELING, a subject of the Emperor of Austria, and a resident of New York, in the county of New York and State of New York, have invented certain new and useful Improvements in Separation of Natural Gas and Distillation Gases into Gasoline and Other Constituents, of which the following is a specification.

This invention relates to improvements in processes and apparatus for separating gasoline and other constituent parts or substances from either natural gas or gas produced by the distillation of mineral oils, bituminous coal, or like substances rich in hydrocarbons.

Processes of the general type to which mine relate include the conducting of the gases through an absorbent liquid, such as a relatively heavy hydrocarbon or emulsion, cooled to facilitate the absorption of the gasoline and other condensable portions of the gas and the absorption of some of the lighter portions of the gas. The enriched absorbent is then removed and heated to drive off the condensed and absorbed ingredients and after being cooled may be returned for reuse in the absorber. The portions distilled off include gasoline which may be condensed and gases which may be permitted to escape or collected and used for heating or like purposes by combustion. The methane is only partly absorbed and escapes during the distillation and together with the non-absorbed portions of the gas escaping from the absorber may be re-conducted to the gas main or gas holder for general use.

One of the disadvantages existent in this process as heretofore practiced results from the fact that the absorbed gasoline in turn acts as an absorbent for the lighter gases so that during the distillation step of the process they pass off from the absorbent but enter the gasoline condensate. These lighter gases cause difficulty when the gasoline is stored in tanks because an increase in temperature resulting from any cause, as for instance, the sun shining on the tank, will produce an increase of pressure in the tank and the increased evaporation and decreased weight of the gasoline.

In practice, a considerable quantity of the lighter gaseous hydrocarbons are lost although of commercial value if collected. The distillation of the absorbed constituents from the absorbent liquid is ordinarily accomplished as a separate operation in a separate apparatus which entails greater cost of plant installation, more handling, and the use of water for condensing purposes. All of the gasoline is not ordinarily extracted as the substances going to make up gasoline such as butane, pentane, hexane, etc., are so intimately associated with the gases which do not condense, such as methane, ethane, and propane, that they are carried along with said gases. The process as usually carried out heretofore is intermittent rather than continuous and entails greater cost for installation of the plant and more labor, besides which there are usually two installations as units for treatment, so that when one is in operation the other is idle being empty preparatory for refilling.

The main objects of my invention are to avoid these various disadvantages and particularly to secure a continuous and uninterrupted process for separating and subdividing the products from the gas in a single series of apparatus. As an important feature of my invention, I produce the necessary heating and cooling effects for distillation, absorption, separation of the gases, etc., by changes to different step stages of compression and expansion. As other features and objects of my invention involve the cooling of the absorber by the gas cooled by its own expansion, the utilizing of the heat of compression of the non-absorbent gas, to distill off the final products from the absorbent before the return of the latter for reuse, and the returning of all of the unabsorbed and uncondensed gases for retreatment or commercial use thereby conserving and preventing the loss of the lighter hydrocarbons contained in the gases operated upon. By means of my invention I secure the production of relatively fixed definite composition products among which is gasoline containing the minimum amount of the lighter gases, so that it is not so readily subject to expansion by increase in atmospheric temperature and loss of weight and increase of pressure and bulk.

Various other objects and advantages of my improved process and apparatus will become more fully apparent from a consideration of a preferred embodiment of apparatus and a preferred specific process. Such apparatus is shown in the accompanying drawings but I wish it particularly understood that such apparatus is to be considered only from an illustrative rather than from a limiting sense, and that various changes may be made both in the apparatus and in the details of the process as carried out therein without departing from the spirit of my invention.

In these drawings:

Figure 1 is a diagrammatic view of the main portions of one form of my apparatus, and Figure 2 is a diagrammatic view of another portion in which certain gases are liquefied.

It will of course be understood that the apparatus may be varied in many respects and that the details of construction of all of the units may be of standard construction or may be such as are obtainable in the market. For that reason, the apparatus is shown only diagrammatically in the drawings, no particular regard being had to just the position of the parts, relative sizes, etc.

Gas may be obtained from any suitable source, such as directly from the main or from any suitable gas holder shown in the drawings as a gas holder A of the usual water-sealed type. The gas may be delivered to this through a supply pipe 10 from the well or other source. From the gas holder the gas is delivered first to a pre-absorber B where a portion of the heavier or readily condensable portions are removed by the action of a suitable liquid absorbent. This may be a heavy hydrocarbon or various other liquids adapted for the purpose. Merely as one means for bringing the gas into intimate association with the liquid to facilitate this absorption I have shown the absorber as a simple liquid tank and the gas delivered from the gas holder through a pipe 11 terminating in a spray head 12 within the liquid and adjacent to the bottom of the tank so that the escaping gas will bubble up through the liquid and collect in the upper part of the tank or pre-absorber. The non-condensed or non-absorbed portions of the gas are drawn off from the upper part of the pre-absorber through a pipe 13 by the action of an air compressor C. This compressor is of such a type that it will put the gas under a comparatively high pressure which may for instance approximate fifteen or twenty atmospheres. The compressed and therefore very hot gas is delivered through one or more heat interchangers to a main absorber D. I have shown three of these heat interchangers E, F, and G, although it will of course be understood that a larger or smaller number may be employed. I do not wish to be limited to any particular type of heat interchanger, except that I employ such a construction that gas may be separated from the liquid which forms the other fluid of the heat interchanger as will be later more particularly pointed out. These heat interchangers in effect act as stills in the heating of the liquid by the heat of compression of the gas. I have shown coils 14, 15, and 16 in the tanks forming the combined stills and heat interchangers E, F, and G. The highly compressed and hot gas may be delivered under pressure from the compressor through a pipe 17 through the coil 14, thence through a pipe 18 to the coil 15 and thence through a pipe 19 to the coil 16. There is also provided a pipe 20 and suitable valves whereby the hot compressed gas may be delivered directly to the coil 16 without passing through the coils 14 and 15 or may pass through either or both of the coils 14 and 15 in series with the coil 16, and the pipe connections have suitable manually operable valves for controlling the flow through these pipes and coils. The valves may be so set that only a part of the gas will go through the coil 14 and this together with another part or the remainder pass through the coil 15 before reaching the coil 16. Substantially all of the heat has been abstracted from the compressed gas by the time it leaves the coil 16 and before being delivered to the main absorber D. This absorber I have shown in the form of a tank, containing the absorbent liquid and with a screen 21 near the bottom and beneath which the cooled, compressed gas is delivered through a pipe 22 from the coil 16. The gas bubbles up through the liquid to the top of the absorber. Preferably some suitable means are employed for obstructing the free upward movement of the gas and thereby insuring a more intimate mixture of the gas with the liquid and the greater absorption of the condensed or condensable and absorbable constituents. Such means may be pebbles or other small pieces of material supported on the screen 21 and extending up to the liquid level in the tank. I have illustrated only a few such pebbles or the like at the bottom of the tank.

To facilitate and greatly increase the absorption I cool the liquid to a low temperature and to effect such cooling I utilize the drop in temperature resulting from an expansion of the gas passing through the absorber. One means of accomplishing this includes a coil 23 with its upper end in the absorber above the liquid level and controlled by an expansion valve operable from outside of the absorber. The gas bubbling up through the liquid is under high pressure as is also the gas above the liquid level in the absorber. This high pressure gas escapes past the expansion or pressure reducing valve 24 into the coil and the resulting drop in temperature cools the liquid of the absorber to a comparatively low temperature. The low pressure gas in the expansion coil 23 is conducted through a pipe 25 to one or more cooling coils 26 in the pre-absorber B and thence back to the gas holder through a pipe 27 or to a liquidizing apparatus, hereinafter described, through a pipe 28, there being suitable manually operable valves for controlling the direction of flow.

The gas delivered through the pipe 25 is under some pressure and expands through a pressure reduction valve $25^a$ to the coils 26 to cool the pre-absorber. This valve also permits the pressure in coil 23 to be regulated to control the expansion in coil 23 and the temperature in the absorber D. By this regulation the amount of absorption of the lightest gases methane and ethane, can be partly controlled. At the same time the resulting higher temperature of the absorbent liquid gives greater rectifying effects in tanks L' and L, viz in coils 48 and 49.

From the foregoing it will be seen that the low pressure gas after being taken from the gas holder first has certain of the more readily absorbable ingredients removed in the pre-absorber, is then put under high pressure and thereby heated; the heat is removed in the coils of the heat interchanging stills E, F, and G; the cooled gas again subjected to the action of an absorbent to remove further ingredients; is then expanded to the original low or an intermediate pressure, thereby becoming very cold; the low temperature is utilized for cooling first the main absorber D and then the pre-absorber B, and the final lighter or non-absorbed portions go back to the gas holder or to a pipe 28 for commercial use or further treatment.

The absorbent liquid circulates in the opposite direction through these same units of the apparatus with the exception of course of the gas holder and gas compressor. The liquid is withdrawn from the pre-absorber B by a force pump H and delivered through a pipe 29 to the main absorber D. The pump must be of such size and have the requisite power to deliver this liquid against the high gas pressure in the absorber D. The stills or heat interchangers E, F, and G, and the main absorber D are connected, at their upper ends, by a pipe 30 so that the gas pressure in the upper part of each will remain the same. The liquid entering the absorber D through the pipe 29 may overflow through pipe 31 to the bottom of the tank G, from the upper part of the latter through a pipe 32, to the bottom of the tank F, from the upper part of the latter through a pipe 33, to the bottom of the tank E, and from the upper part of the latter through a pipe 34. by the pressure equalizing pipe 30, the liquid levels will be the same in all four of these tanks and the circulation is so maintained that there will be a free gas space at the upper end of each. The liquid gradually increases in temperature as it flows through the heat interchangers E, F, and G in the opposite direction to the flow of the hot compressed gas through the compressor C. To further absorb heat, it preferably passes through the pipe 34 through a jacket J on the compressor C and from there the liquid is delivered to a storage tank and still K. It will be noted that up to this point the liquid is maintained under the high pressure imparted to it by the pump H. The high pressure liquid passes from the jacket through a coil 35 in the tank K and then its pressure is partly released by a valve 36 and the liquid delivered directly to the tank. From the tank the liquid may flow by gravity past a second reducing valve 37 in a pipe 38 to the low pressure pre-absorber B.

From the foregoing it will be noted that the liquid has absorbed some of the constituents of the gas in the pre-absorber B, it is then put under high pressure and delivered to the main absorber D where it comes in intimate contact with the high pressure gas from the compressor C. At the same time its temperature is brought down very low by the gas expanding in the coil 23. The liquid therefore absorbs the maximum amount of the absorbed constituents of the gas due not only to the high pressure of the gas but also to the low temperature of the liquid and gas. The low temperature highly charged liquid then flows through the heat interchangers where separate fractions of the absorbed constituents of the gas are distilled off as the temperature of the liquid rises and the main pressure is finally released and a final heating effect given to the liquid so that the balance of the absorbed constituents will be driven off in the tank K. The return of the liquid from the tank K to the pre-absorber completes the cycle of the liquid.

From the foregoing it has been noted that the liquid after having absorbed certain of the constituents of the gas is heated in the units G, F, E, and K in succession. This heating of the liquid tends to drive off the absorbed constituents of the gas so that they collect in the upper parts of these units. By the proper control of the temperatures and pressures, the distilled off portions constitute separate fractions. These may be separately withdrawn and condensed. The first or lighter constituents are to be driven off in the units G and F while the heavier units such as those going to make up gasoline will be driven off from the units E and K. For collecting and condensing these gaseous bodies I may employ an apparatus arranged substantially as follows.

The distilling apparatus G is the first through which the liquid absorbent passes with its charge from the absorber D and is at the lowest temperature, as it is farthest from the compressor C which constitutes the source of heat for the coils 14, 15 and 16. Therefore, the lightest of the absorber constituents will escape from the liquid in the tank G, collect in the upper part of said tank, and escape through the pipe 40. This pipe leads to a coil 41 in the absorber B so that the gases will be cooled to the low temperature of the absorber. Within this coil some or a considerable portion of the gas may liquefy as it is still under the high pressure from the compressor C. The liquefied as well as the un-liquefied portions drain from the coil and are delivered from the pipe 42 to a collecting tank L' where the liquid and gas may separate. The liquid which may be propane and others, may be drawn off from this collecting tank into steel bottles or other receptacles, through a valve controlled drain pipe 43.

The liquid in the distilling apparatus or tank F will be a somewhat higher temperature than the liquid in the tank G if the compressed gas be delivered from the coils 14, 15, and 16 in succession. From the liquid in this tank a further fraction of the absorbed constituents will be distilled off and may pass by a pipe 44 to a second coil 45 in the absorber D and be cooled to the low temperature of the latter. As this gas is also under the high pressure of the compressor, a portion may be liquefied and such liquid as well as the un-liquefied gas may flow through the pipe 46 to a second collecting tank L. Here the gas and liquid may separate and the liquid, which if the proper temperatures and pressures are maintained, may be butane, and may be drawn off into steel bottles or other receptacles through a valve controlled outlet 47. The tank L as well as the tank L' may serve as rectifying tanks as well as collectors and the liquid therein may be heated to drive off the lighter constituents which may be absorbed in the liquefied propane, and butane and others. For such heating, I have shown coils 48 and 49, each supplied by the pipe 50 and discharging into a pipe 51. The heating fluid may be a portion of the compressed gas from the compressor before being discharged into the absorber D. As previously noted, the compressed gas is at successively lower temperature in the coils 14, 15, and 16. In order to get the desired temperature in the coils 48 and 49, I have shown the pipe 50 with separate valve controlled connections to the outlets of each of the coils 14, 15, and 16. By the proper manipulation of these valves, the gas at various different temperatures may be delivered to the coils 48 and 49. Although I have shown both of these coils supplied from the same pipe 50, it will of course be evident that they may have separate connections to the pipe line between the compressor and the absorber so that gas at a higher temperature may be delivered to the coil 49 rather than to the coil 48. The amount of gas flowing through these coils may be regulated by opening to a greater or lesser extent their inlet and outlet valves, although it is not intended that there shall be any material expansion on these valves. The gas after passing through the heating coils 48 and 49 may be returned to the system at any desired point, as for instance, adjacent the point of admission of the high pressure gas pipe line to the absorber D. In advance of such point of return, the pipe line may have a valve 52 which may be partially closed to effect a greater or lesser circulation of the gas through the coils 48 and 49.

As the action of the heating coil 49 may serve to distill off some liquid which it is desired to retain in the tank L, I provide a rectifying column at the upper end of the tank L and provide cooling means therein. This cooling means is shown in the form of a coil 53 having its outlet end connected by a pipe 54 to the upper part of the propane and others collecting tank L'. The unliquefied method and unliquefied or re-vaporized portions of the propane and others separate from the liquid in the tank L', and which is still under high pressure may be expanded through an expansion valve 55 into the coil and produce a very low temperature. The exhaust from this coil may be delivered through low pressure return pipes 56 and 57 to the low pressure return pipe line, as for instance, adjacent to the inlet of the coil 26 of the pre-absorber. Here any remaining low temperature of the expanded gas may be utilized in the cooling of the pre-absorber. The uncondensed gases in the tank L as well as the gases distilled off in said tank by the heating coil 49 and uncondensed by the cooling coil 53, may escape from the upper end of the rectifying column through a pipe 58 to an expansion valve 59. The low temperature resulting from the expansion at the valve 59 may be utilized in a cooling coil 60, as hereinafter described, and the low pressure expanded gases return through a pipe 61 and the pipes 56 and 57 to the low pressure gas on its way back from the absorber. Any residual low temperature of this gas may also be utilized in the pre-absorber.

The tank or distilling apparatus E is subjected to a higher temperature than the tanks F and G if the heating medium be circulated through the coils 14, 15, and 16 in succession. The lighter gasoline will be distilled off from the liquid in the tank E, collected in the upper part thereof, and delivered through a pipe 62 to a collecting tank M. This gas is under the high pressure produced by the compressor and therefore before entering the tank M it is permitted to expand to a limited extent through an expansion valve 64. The resulting drop in temperature will cause a condensation or liquefaction of a considerable portion of this gas and particularly the heavier parts so that the lighter liquid gasoline will collect in the tank M. Preferably the pipe 62 instead of delivering directly into the tank delivers through a coil 65 terminating in a spray-nozzle or head 66 below the liquid level in the tank so that all of the gas which does not liquefy upon expansion must bubble up through the accummulated liquid and this will aid in the condensation or liquefaction of the further quantity of the gas and the driving off from the condensed liquid, the lighter gases which are absorbed in the liquid. This lighter gasoline may be drawn off through a valve controlled outlet 67. The upper part of the collecting tank M has a rectifying column and it is within this column that the cooling coil 60, above referred to, is placed. Thus the lighter gases rising from the liquid in the tank M are cooled and a certain portion thereof is condensed and returned.

The gases which are not liquefied in the tank M by the cooling effect of the expansion at the valve 64 or the cooling effect of the coil 60 in the rectifying column, may escape through a pipe 68. This gas, if the expansion at the valve 64 has been complete, may be returned directly to the pipe line 57 but preferably the expansion is not complete, and further successive expansions take place through one or more expansion valves 69 and 70 and cooling coils 71, 72 and 73, the expansion at the last valve 70 being to the same low presure resulting from the expansion at the valves 55 and 59 above referred to.

In the distilling apparatus K, the pressure, as previously noted, has been reduced materially below that of the tanks E, F, and G by the escape of the liquid through the expansion valve 36. Here the reduction in pressure accompanied by the heating effect of the coil 35 coming direct from the jacket of the compressor, drives off the heavier gasoline. This separation may also be facilitated by terminating the delivery pipe in the gas space of the tank K above the liquid level therein. The heavier gasoline vapors pass off through a pipe 74 to a cooling tank N where a considerable portion of the gases liquefy to make the heavier gasoline. The cooling in this tank may be effected by the coil 73 of the gas return pipe from the tank M. From the tank N the liquid and un-liquefied gas may escape through a pipe 75 and an expansion valve 76, where the pressure is dropped to that of the low pressure return pipe 56. The pipe 75 delivers through a coil 77 and submerged spray head 78 in a tank O similar to the tank M, and from which a heavier gasoline may be drawn off through a valve controlled pipe 79. The upper part of the tank O may constitute a rectifying column containing the coil 72 previously referred to and through which the gas from the final expansion valve 70 is delivered. The gases which are not liquefied either in the tank O or the rectifying column of the latter may escape through a pipe 80 to a final collecting tank P, having a valve controlled draw-off 90 for the gasoline. The upper part of this tank also may constitute a rectifying column cooled by the coil 71 previously referred to. Any gas from the tank K which has not been liquefied in the tanks N, O, or P or which have been vaporized therefrom, may be withdrawn from the top of the column of the tank P and delivered through a pipe 91 leading directly or indirectly to the gas return pipe 57.

In some circumstances, it may be found desirable to further extract the absorbed constituents from the liquid absorbent after it leaves the tank K and before it passes back to the pre-absorber B for retreatment. In case this is necessary or desirable, I may close the valve 37 in the pipe 38 which connects the distilling apparatus K and the pre-absorber B, and may cause the liquid to flow through the tank K through a pipe 92 to a tank R and from the latter back through a pipe 93 to the opposite side of the valve 37 or directly to the pre-absorber B. The tank R may have a gas space above the liquid level and connected to the intake of a vacuum pump S so that the reduction in pressure in the tank R will cause the separation of the final absorbed constituents from the liquid. The vacuum pump S may deliver the vapor through a pipe 94 directly to the tank N and at the same pressure as exists within the latter, so that these constituents may there liquefy or pass on with the constituents removed from the tank K. To further separate the absorbed constituents from the liquid in the tank R, there may if desired be provided a heating coil within said tank and receiving its heating medium from any point in the system where the gas or liquid at the desired temperature is found.

From the foregoing, it will be seen that by means of my process and apparatus I am able to absorb from the natural gas or other hydro-carbon gas supply a large percentage, if not all, of the hydro-carbon gases and separate them into various fractions which may be substantially pure compounds. The propane may be collected in the tank K, the butane in the tank L, the pentane in the tank M, and the hexane and heptane in the tanks P and O. The purity of the several compounds may be regulated by a proper control of the degree of compression and resulting heat of compression, the number of expansion steps, and resulting cooling effects, and the proper design of coils, tanks, etc. It will of course be evident that all of the various units of the apparatus may be of such size and design that a single unit may serve or they may be of smaller capacity or different design, and a plurality of units connected up in parallel or in series. All of the heavier and most of the lighter constituents will be collected and liquefied and may be drawn off into receptacles of the proper character dependent upon the pressure resulting from the raising of the liquid to atmospheric temperature or such other temperatures as it may be subjected to during storage, shipment, or use. By a less accurate and exact control, the line of demarcation between the several collected liquids may be less exact, and the liquid withdrawn from the tanks O and P may be employed as commercial gasoline.

As previously noted, the unliquefied portion of the gas passing through the apparatus above described, may be returned directly to the gas holder for retreatment or may be delivered through the pipe 28 by the proper control of the valves at the outlet from the coils 26. With the proper control of temperatures, pressures, etc., the gas which may be drawn off through the pipe 28 may be substantially pure methane or methane and ethane. A large portion of this may be obtained in liquid form by the use of the apparatus shown in Figure 2. The gas from the pipe 28 may be compressed to a very high pressure in the compressor T and delivered from the latter through a pipe 100 to a tank U, thence by a pipe 101 to a tank V, thence by a pipe 102 to a tank W and so on through a series of any desired length. Each of the tanks U, V, W, etc. may have corresponding jackets X, Y, Z, etc. and a small portion of the gas from each tank may be expanded into the jacket of the same tank. As shown, the tank U is connected to its jacket by a pipe 103 including an expansion valve 104; the tank V is connected to its jacket by a pipe 105, including an expansion valve 106; and the tank W is connected to its jacket by a pipe 107, including an expansion valve 108. The expansion valves permit a drop of pressure from the very high pressure produced by the compressor T and which exists throughout the series of tanks, to substantially atmospheric pressure or to the pressure of the gas holder A. This expansion at the valve 104 cools the jacket X, and therefore the tank U, and the gas thus cooled in the tank U is further cooled in each of the series and without reduction in pressure. The series may be continued until the methane is collected as a liquid in the final tank, from which it may be drawn off through a valve controlled pipe 109 to steel bottles or other appropriate containers, suitable for holding liquefied methane, after the latter warms up to atmospheric temperature or such other temperature as the liquefied gas may be subjected to during shipment, storage, or use. The expanded gas from each of the jackets may escape through suitable outlet pipes 110, 111, and 112 to a return pipe 113, leading back to the gas holder A, or to any other point at which it is desired to employ such gas. The compressor T may compress the gas to 50 or even 60 atmos. pressure as may be found necesary for producing the desired result, and it will of course be understood that suitable or appropriate means are employed for removing the heat of compression as for instance, by a jacket on the compressor, or a coil in the pipe 100. This heat may be utilized in the portion of the apparatus shown in Figure 1, if desired.

As the boiling point of methane at atmospheric pressure is $-146°$ C., the liquefaction may take place at the critical temperature and pressure, which is made $-95.5°$ C. at 50 atmospheres pressure. The pressure of the liquefied methane at atmospheric temperature may rise to 75 atmospheres or even over 100 atmospheres according to the heat of the atmosphere. If a mixture of methane and ethane is desired, then the tank K may be heated to such a degree by the coil 48 that all of the ethane will be driven over and pass with the methane to the liquefying apparatus shown in Figure 2, but in this case I increase the pressure in this apparatus to about 80 atmospheres and carry on the operation as hereinbefore described. This mixture of liquefied methane and ethane is valuable for many purposes and may be separated later, if desired.

The process hereinbefore described assumes the use of natural gas or other hydrocarbon gas at a comparatively low pressure. From some wells the gases come off with a very high pressure which in some instances may be 200 lbs. This is more than is needed for purposes of expansion and corresponding reduction of temperature and therefore a partial reduction of pressure may be utilized for power purposes, which power could be used for operating an air compressor in which air may be compressed for the production of the necessary heat for distilling and re-distilling purposes in the tanks E, F, G, and K. The gases could therefore act in an engine cylinder and expand to the pressure wanted and advisable, in view of the later expansion of the gases for cooling of the absorbent liquid. In such a plant, the only difference from that illustrated would be that the compressor C instead of taking gas from the gas holder would take air from the atmosphere and deliver the same through the several coils 14, 15, and 16 and there discharge from the system while the gas to be treated might be delivered directly from the pre-absorber to the final absorber D. Such change in the apparatus would involve merely the insertion of appropriate pipe couplings and valves.

In case the pressure of the gases to be treated would not suffice for furnishing power for the compressor and later for expansion for cooling purposes, a portion only of the gas could be expanded to low pressure in the power cylinder and sent back to the gas main after having given up its pressure while another portion of the original gas could be subjected to the absorption and separation in the atmosphere and give up its pressure by expansion in the coils for cooling purposes as hereinbefore described. The use of the pressure of the unrequired well gases, which would thus be used for power purposes, would cost nothing as the proprietors of the wells are usually glad to get rid of a pressure which is of no use to them.

Having thus described my invention what I claim as new and desire to secure by Letters Patent is:

1. The process of treating hydro-carbon gases, consisting in forcing the circulation of said gases through distilling, cooling and absorbing apparatus, and varying the pressure at different points in the circuit to effect temperature changes therein for distilling and absorption purposes.

2. The process of treating hydro-carbon gases, consisting in forcing a circulation of said gases and an absorbent liquid in opposite directions through distilling, cooling and absorbing apparatus, and varying the pressures of said gases at different steps to produce heat changes for absorption and distilling purposes.

3. The process of extracting constituents from hydro-carbon gases consisting in compressing the gases to heat the same, utilizing the heat for distilling absorbed portions of the gas from a liquid, delivering said compressed gases to said liquid, and subjecting the latter to said heating action.

4. The process of extracting constituents from hydro-carbon gases consisting in compressing said gases to heat the same, and passing the gases while under compression through an absorbent liquid after distilling another portion of said liquid by the heat of said gases and thereby cooling said gases.

5. The process of extracting gasoline from hydro-carbon gases, including the steps of compressing the gases and thereby heating the same, utilizing the heat of compression to heat a still, delivering the cooled gases into absorbing relationship with a liquid, and distilling from said liquid the absorbed portions of the gas by the heat of compression of the first mentioned gases.

6. The process of extracting gasoline or other constituents from hydro-carbon gases, including the continuous circulating of an absorbent liquid through an absorber, a still, and a cooler in succession to form a closed cycle, compressing said gases, utilizing the heat of compression to heat said liquid in the still, delivering the gases to the liquid in the absorber and thereafter expanding the unabsorbed gases and utilizing the resultant cooling effect for cooling the liquid in said cooler.

7. The process of extracting heavier ingredients from hydro-carbon gases, including the circulating of an absorbent liquid in a closed cycle, through an absorber and a still, compressing said gases and thereby heating the same, utilizing the heat of compression for the heating of the liquid in the still, delivering the compressed gases to the absorber, expanding the unabsorbed portion of said gases to thereby cool the same, and lowering the temperature of the absorber by the action of the expanded gases.

8. The process of extracting heavier constituents from hydro-carbon gases, including the steps of compressing the said gases, intermixing the compressed gases and an absorbent liquid under corresponding pressure, expanding the unabsorbed portion of the gases to cool the intermixed liquid and gases, and distilling from said liquid the absorbed portion of the gases by the heat of compression of the gas prior to the intermixing of the latter with the liquid.

9. The process of extracting heavier constituents from hydro-carbon gases, including the steps of circulating an absorbent liquid in a closed cycle under high pressure through an absorber and a heater and under low pressure through a further heater and a cooler, compressing said gases, heating the liquid in said high pressure heaters by the heat of compression of the gases, delivering the gases after the extraction of the heat of compression but at high pressure to said absorber, and expanding the unabsorbed portion of the gases to cool said absorber.

10. The process of extracting heavier constituents from hydro-carbon gases, including the steps of circulating an absorbent liquid in a closed cycle under high pressure through an absorber and a heater and under low pressure through a further heater and a cooler, compressing said gases, heating the liquid in said high pressure heaters by the heat of compression of the gases, delivering the gases after the extraction of the heat of compression but at high pressure to said absorber, and expanding the unabsorbed portion of the gases to cool said cooler.

11. The process of extracting heavier constituents from hydro-carbon gases including the circulating of an absorbent liquid in a closed cycle through a low pressure preabsorber, a high pressure absorber, a high pressure still and a low pressure still, compressing the gases, utilizing the heat of compression for heating the high pressure still, delivering the gases to the liquid in the high pressure absorber, and expanding the unabsorbed portion of the gases to cool the preabsorber.

12. The process of extracting heavier constituents from hydro-carbon gases including the circulating of an absorbent liquid in a closed cycle through a low pressure preabsorber, a high pressure absorber, a high pressure still and a low pressure still, compressing the gases, utilizing the heat of compression for heating the high pressure still, delivering the gases to the liquid in the high pressure absorber, and partially expanding the unabsorbed portion of the gas to cool the high pressure absorber and further expand said gas to cool the preabsorber.

13. A process for the separation of certain of the ingredients from a hydro-carbon gas, including the steps of compressing the gas and thereby heating it, removing the heat of compression in a series of successive steps, delivering the compressed gas to a liquid, successively heating said liquid by said successive cooling steps of the gas, and withdrawing the separate gases distilled off from said liquid at each of said steps.

14. A process of separating certain of the ingredients from a hydro-carbon gas, including compressing the gas to a high pressure and thereby heating it, delivering the compressed gas to a liquid absorbent and circulating said liquid in counter-current heat interchanging relationship with the compressed heated gas to remove the heat of compression of the latter, and distill off from the liquid absorbed portions of the gas, and separately collecting the portions distilled off at successively increasing temperatures.

15. A process of separating certain of the ingredients from hydro-carbon gases, including the delivering of the gas under high pressure to an absorbent liquid, withdrawing the liquid and heating it in successive stages at substantially the pressure of the gas to drive off the separate absorbed constituents, reducing the pressure of the liquid, and further heating it to drive off other absorbed constituents.

16. A process of separating certain constituents from hydro-carbon gases including the compressing of the gas to a high temperature and thereby heating the same, delivering the compressed gas after the removal of the heat of compression to an absorbent liquid, withdrawing said liquid and subjecting it while under high pressure to the heating effect of the hot compressed gases to distill off certain absorbed constituents, and reducing the pressure of the liquid to approximately that of the atmosphere to liberate other absorbed constituents.

17. A process of separating certain constituents from hydro-carbon gases, including the compressing of the gas to a high temperature and thereby heating the same, delivering the compressed gas after the removal of the heat of compression to an absorbent liquid, withdrawing said liquid and subjecting it while under high pressure to the heating effect of the hot compressed gases to distill off certain absorbed constituents, and reducing the pressure of the liquid to a point materially below the pressure of the atmosphere to withdraw further absorbed constituents.

18. A process of separating certain constituents from hydro-carbon gases including the compressing of the gas to a high temperature and thereby heating the same, delivering the compressed gas after the removal of the heat of compression to an absorbent liquid, withdrawing said liquid and subjecting it while under high pressure to the heating effect of the hot compressed gases to distill off certain absorbed constituents, and reducing the pressure of the liquid to approximately that of the atmosphere and further heating it by heat produced by the compression of the gases to liberate other absorbed constituents.

19. A process of separating hydro-carbon gases into separate constituents, including delivering the gases under high pressure to an absorbent liquid maintained at low temperature, circulating the liquid through a series of heaters maintained at successively increasing temperatures to separately distill off absorbed constituents of lower boiling points, and reducing the pressure and further increasing the temperature to distill off absorbed constituents of still higher boiling points.

20. The process of the character described, including the steps of mixing a hydro-carbon gas and an absorbent liquid under high pressure, expanding the unabsorbed portion of the gas and thereby cooling the same, utilizing such cooling action to maintain a low temperature in the intermixing liquid and gas, withdrawing the liquid, heating the same to distill off a portion of the absorbed constituents, and cooling said withdrawn gaseous constituents by the low temperature expanded unabsorbed constituents.

21. The process of the character described, including the steps of mixing a hydrocarbon gas and an absorbent liquid under high pressure, expanding the unabsorbed portion of the gas and thereby cooling the same, withdrawing the liquid, heating the same to distill off a portion of the absorbed constituents, and cooling said withdrawn gaseous constituents by the low temperature expanded unabsorbed constituents.

22. The process of the character described, including the steps of mixing a hydrocarbon gas and an absorbent liquid under high pressure, expanding the unabsorbed portion of the gas and thereby cooling the same, withdrawing the liquid, heating the same to distill off a portion of the absorbed constituents, cooling said withdrawn gaseous constituents by the low temperature expanded unabsorbed constituents, and expanding a further portion of the distilled off gaseous constituents to further cool the first mentioned distilled off gaseous constituents.

23. The process of the character described, including subjecting a hydro-carbon gas in a final sub-divided state to the action of an absorbent liquid under high pressure, heating said liquid to drive off certain of the absorbed constituents, separately heating said liquid to a further extent to drive off other absorbed constituents, expanding the gas driven off at one stage to cool the gas drawn off at the other stage and while still under high pressure.

24. The process of the character described, including subjecting a hydro-carbon gas in a finely sub-divided state to the action of an absorbent liquid under high pressure, heating said liquid to drive off certain of the absorbed constituents, separately heating said liquid to a further extent to drive off other absorbed constituents, expanding the gas driven off at one stage to cool and liquefy the gas drawn off at the other stage and while still under high pressure, and warming said liquefied gas to distill off the lighter of the liquefied constituents.

25. The process of the class described, including the steps of effecting an intimate mixture of a hydro-carbon gas and an absorbent liquid under high pressure, withdrawing the liquid heating the same to drive off the lighter absorbed constituents while under high pressure, reducing the pressure of the liquid thereby liberating heavier absorbed constituents at lower pressure, and expanding the first mentioned withdrawn constituents to low pressure, and utilizing the cooling effect thus produced in liquefying the second mentioned constituents.

26. In a process for separating hydro-carbon gases into separate fractions, including effecting an intimate mixture of the gases and an absorbent liquid under high pressure, continuously withdrawing liquid and subjecting it to successively higher temperature to distill off separate fractions of the absorbed constituents, successively reducing the pressure to drive off further absorbed fractions, expanding one or more of the fractions driven off at high pressure, and utilizing the cooling effect for the liquefaction of fractions driven off under lower pressures.

27. The process of treating hydro-carbon gases, consisting in forcing a continuous stream of the gases under high pressure in heat interchanging relationship to distilling tanks and into a liquid containing absorbing tank, causing the absorbent liquid to flow under pressure from the absorbing tank through said distilling tanks, a cooling apparatus, and means for cooling said apparatus by the expansion of gases driven off from said distilling apparatus.

28. The process of treating hydro-carbon gases, consisting in compressing said gases to produce heat and circulation, causing the same to pass in heat interchanging relationship with the distilling apparatus, discharging the compressed cooled gas into an absorbing tank containing absorbent liquid, conducting the unabsorbed gases back to the point of start, causing said absorbent liquid to pass through said distilling apparatus, cooling said liquid, and returning it to the absorbing tank.

29. The process of treating hydro-carbon gases, consisting in compressing said gases to produce heat and circulation, causing the same to pass in heat interchanging relationship with the distilling apparatus, discharging the compressed cooled gas into an absorbing tank containing absorbent liquid, conducting the unabsorbed gases back to the point of start, causing said absorbent liquid to pass through said distilling apparatus, cooling said liquid, returning it to the absorbing tank, and separately condensing the vapors driven off from said liquid at successively increased temperatures and decreased pressures on its way from said absorbing tank to said cooling apparatus.

30. The process of treating hydro-carbon gases, which consists in subjecting said gases to the absorbent action of a liquid under comparatively low pressure, withdrawing the liquid, subjecting it to high pressure, withdrawing the unabsorbed gases, compressing them to high pressure, withdrawing the heat of compression, and subjecting the compressed gases to the action of the liquid under high pressure, and expanding the unabsorbed gases to cool the liquid and gases being mixed at low pressure.

31. The process of treating hydro-carbon gases, which consists in subjecting said gases to the absorbent action of a liquid under comparatively low pressure, withdrawing the liquid, subjecting it to high pressure, withdrawing the unabsorbed gases, compressing them to high pressure, withdrawing the heat of compression, subjecting the compressed gases to the action of the liquid under high pressure, expanding the unabsorbed gases to cool the liquid and gases being mixed at high pressure, and further expanding said gases to cool the liquid and gases being mixed at low pressure.

32. The process of obtaining methane from hydro-carbon gases, consisting in subjecting said gases to the absorbent action of a liquid under high pressure, withdrawing the liquid, subjecting it to a slight increase in temperature without decrease in pressure to drive off the lighter gases, mixing said lighter gases with the unabsorbed portion of the hydro-carbon gases, and expanding a portion of such mixture to cool a further portion remaining under high pressure.

Signed at New York city in the county of New York and State of New York this 25th day of September A. D. 1918.

ALBRECHT von GROELING.